(12) United States Patent
Takeuchi et al.

(10) Patent No.: US 7,811,504 B2
(45) Date of Patent: Oct. 12, 2010

(54) MOLDED PRODUCT AND METHOD OF MANUFACTURING THE SAME

(75) Inventors: Yasuyuki Takeuchi, Handa (JP); Keiji Hiroe, Obu (JP); Hideki Iwamoto, Handa (JP)

(73) Assignee: Tokai Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 12/318,220

(22) Filed: Dec. 23, 2008

(65) Prior Publication Data
US 2009/0169821 A1 Jul. 2, 2009

(30) Foreign Application Priority Data
Dec. 28, 2007 (JP) ............................. 2007-339662

(51) Int. Cl.
| B29C 44/22 | (2006.01) |
| B29C 59/08 | (2006.01) |
| B29C 35/10 | (2006.01) |
| B28B 11/08 | (2006.01) |

(52) U.S. Cl. .................. 264/415; 264/481; 264/48; 264/80; 264/129; 264/293; 264/341

(58) Field of Classification Search .................. 264/413, 264/415, 416, 419, 41, 48, 80, 448, 476, 264/481, 45.9, 46.1, 51, 53, 54, 55, 129, 264/293, 341
See application file for complete search history.

(56) References Cited

U.S. PATENT DOCUMENTS

| 3,198,689 A | 8/1965 | Lansing |
| 4,552,713 A * | 11/1985 | Cavicchioli .................. 264/162 |
| 4,830,898 A | 5/1989 | Smith |
| 5,143,772 A | 9/1992 | Iwasa |
| 6,686,020 B2 | 2/2004 | Sakuma |
| 6,786,007 B2 | 9/2004 | Aritake |
| 6,874,281 B2 | 4/2005 | Fujita et al. |

(Continued)

FOREIGN PATENT DOCUMENTS

| FR | 1.421.604 | 11/1965 |
| GB | 027118 | 10/1914 |
| GB | 996755 A * | 6/1965 |
| JP | A 10-195223 | 7/1998 |

(Continued)

OTHER PUBLICATIONS

Human Translation of Miyashiro et al. (JP 2002-146087 A), May 2002.*
Apr. 22, 2010 Office Action issued in Japanese patent application No. 2007-339662 (with translation).

*Primary Examiner*—Joseph S Del Sole
*Assistant Examiner*—Ryan Ochylski
(74) *Attorney, Agent, or Firm*—Oliff & Berridge, PLC

(57) ABSTRACT

A molded product includes a matrix formed of a polymer material and a plurality of capsules dispersed in the matrix. An unevenness is formed on a surface due to expansion of the capsules. Some of the capsules have expanded without bursting and include an exposed outer shell portion that protrudes from a surface, and/or some of the capsules have burst and include an outer shell protruding portion that protrudes outward from the surface. Finish processing is performed, which eliminates the outer shell protruding portions and/or the exposed outer shell portions from the surface. This results in a molded product in which a color difference due to frequency of contacting an object, etc. is not easily generated.

14 Claims, 4 Drawing Sheets

U.S. PATENT DOCUMENTS

| | | |
|---|---|---|
| 7,124,539 B2 | 10/2006 | Tsuchida et al. |
| 7,152,374 B2 | 12/2006 | Gopalan |
| 7,318,613 B2 | 1/2008 | Hiroe et al. |
| 7,652,097 B2 | 1/2010 | Nonaka et al. |
| 2003/0220411 A1 | 11/2003 | Sakai et al. |
| 2004/0043188 A1 | 3/2004 | Tsujiguchi |
| 2004/0189044 A1 | 9/2004 | Nagata |
| 2006/0186695 A1* | 8/2006 | Hiroe et al. .............. 296/146.9 |
| 2006/0258793 A1* | 11/2006 | Nonaka et al. .............. 524/495 |
| 2007/0024084 A1 | 2/2007 | Oba et al. |

FOREIGN PATENT DOCUMENTS

| | | |
|---|---|---|
| JP | A-2002-146087 | 5/2002 |
| JP | A 2006-257313 | 9/2006 |
| JP | A-2007-528816 | 10/2007 |
| WO | WO 01/96135 A2 | 12/2001 |

* cited by examiner

MOLDED PRODUCT AND METHOD OF MANUFACTURING THE SAME

BACKGROUND

This invention relates to a molded product comprising a polymer material, and specifically to a molded product presenting a fabric-like appearance by having a small unevenness on a surface.

A molded product is known in which a polymer material such as rubber is a matrix (main material which becomes a basic material), a molding material including thermo-expandable capsules is molded, and a fabric-like appearance is created by forming a plurality of uneven portions on a surface of the molded product, using expansion of the capsules and bursting after expansion. For example, Japanese Published Patent Application 2007-528816 (JP-A-2007-528816) discloses an elongate ornamental member provided with an ornamental portion having a surface which has been made coarse by expansion and bursting of microcapsules. Japanese Published Patent Application 2002-146087 (JP-A-2002-146087) is listed as a prior art reference related to this type of technology. This type of molded product can be used as a trim material such as a weather strip, etc., which is mounted along the periphery of an opening of an opening/closing door of a vehicle such as a car and suppresses raindrops, etc. from entering the vehicle interior.

SUMMARY

However, if a molded product is thus used, which forms a fabric-like surface (sometimes referred to as a "design surface") by using capsules, depending on the usage, the usage situation, etc., there are times that a hue (tone of color) gradually varies (for example, a color light and shade effect is generated) between portions in which frequency of contacting something such as a human body, etc. with the surface is relatively high (portions receiving an exterior force such as friction, etc. more frequently than other portions) and portions in which that frequency is relatively low. Generating a location-dependent color difference in this way is not desirable because appearance quality of the molded product may deteriorate. In particular, in a molded product (ornamental body) requiring a decorative quality, it is desirable that such a phenomenon should be suppressed from being generated, or that the effect of the phenomenon should be alleviated.

Thus, an object of exemplary embodiments of this invention is to provide a molded product having a fabric-like surface, in which a location-dependent color difference is not easily generated. Another object of exemplary embodiments is to provide a method of manufacturing the molded product.

The inventors of this disclosure discovered that with respect to a location-dependent color difference, in a portion in which frequency of contacting an object is relatively high, an outer shell of capsules existing at the surface of the molded product comes off easily from the molded product due to the contact, and the difference in a degree to which the outer shell of the capsules comes off depending on the location is a main cause of the color difference. Furthermore, these inventors discovered that by eliminating (causing to disappear) the exposed outer shell portions of the capsule outer shells which protrude outward from the surface of the molded product, and/or outer shell protruding portions, which are portions of capsules that have burst and protrude outward from the surface, coming off of the outer shells is effectively suppressed and generation of a color difference is suppressed. Thus, the inventors made this invention.

According to exemplary embodiments of this invention, as described below, a method of manufacturing a molded product is provided.

That is, in some aspects, the invention provides a method of manufacturing a molded product, which includes a matrix formed of a polymer material and a plurality of capsules dispersed within the matrix, and in which an unevenness is formed on a surface due to expansion of the capsules. The method includes preparing a molded body, which is provided with exposed outer shell portions of capsules that have expanded and have been exposed to the surface, and outer shell protruding portions of the capsules that have burst after expansion and protrude outward from the surface, and then performing finish processing, which eliminates the outer shell protruding portions and/or the exposed outer shell portions from the surface of the molded body.

According to this aspect, by performing the finish processing, a molded product can be manufactured in a state in which outer shells (that is, outer shell protruding portions) protruding outward from the surface of the molded body no longer exist (i.e., they disappear). Processing which eliminates in advance the outer shell protruding portions that easily come off in a usage environment by contacting an object has been performed on such a molded product. Thus, even if such a molded product is used in a usage environment for both a portion in which frequency of contacting an object is high and a portion in which frequency of contacting an object is low, a phenomenon generating a color difference between these portions can be suppressed, or the effect of the phenomenon can be alleviated. Therefore, a desirable appearance quality can be maintained.

Furthermore, in general, a composition material of an outer shell of capsules is different from that of a matrix portion dispersing the capsules. Thus, it is difficult to make the color of the capsule outer shells completely the same color as the matrix. Because of this, with respect to a decorative or ornamental surface of a molded product, there are times that color of the capsule outer shell may be confirmed visually as a small spotted mark. Existence of such a spotted mark (that is, color unevenness) could be a problem in a usage, for example, in which a high-level single color (dark black, etc.) is demanded as a surface color of a molded product. In particular, in the outer shell protruding portions, color of the capsule outer shells themselves can be easily confirmed visually, separate from that of the matrix (in other words, they can easily be visually confirmed as a spotted mark). According to a method of manufacturing of this invention, by eliminating the outer shell protruding portions with the finish processing, as a result, the spotted mark can be eliminated. Therefore, a high-level single color (meaning that a plurality of colors do not mix) can be realized on the surface of the molded product, and a molded product with excellent appearance quality can be manufactured.

According to some embodiments, the finish processing is performed so as to eliminate the exposed outer shell portions along with the outer shell protruding portions. By so doing, the local-dependent color difference caused by coming off of the outer shell can be further suppressed.

According to some embodiments, the finish processing is performed so as to eliminate the outer shell protruding portions from the surface of the molded body by thermally deforming (including deformation by melting, contraction, etc.) the outer shell protruding portions, using a surface heating device which heats the molded body from the surface side. By so doing, the finish processing can be further effectively performed.

According to some embodiments, the surface heating device performs at least one of: irradiating infrared rays onto the surface of the molded body, putting a flame close to the surface of the molded body, or blowing a high-temperature gas onto the surface of the molded body. By so doing, the surface of the molded body is heated in a non-contact manner, so the shape of the portion other than the outer shell protruding portions is not easily affected by the finish processing.

According to some embodiments, the finish processing is performed so as to thermally deform the outer shell protruding portions from the surface of the molded body, and keep the unevenness other than the outer shell protruding portions. By so doing, a molded product with excellent design properties (for example, presenting a desirable fabric-like appearance) can be manufactured.

According to some embodiments, the finish processing is performed by moving at least one of the molded body and the surface heating device relative to the other. By so doing, the finish processing can be efficiently performed.

According to some embodiments, the finish processing eliminates the outer shell protruding portions from the surface of the molded body by burning the outer shell protruding portions, using a surface heating device which heats the molded body from the surface side and burns the outer shell protruding portions. By so doing, the finish processing can be effectively performed.

According to some embodiments, the heating device is constituted so as to expose the surface of the molded body to a flame. By so doing, the finish processing can be more effectively performed.

According to some embodiments, the heating device is constituted so as to blow the flame toward the surface of the molded body. By so doing, the finish processing can be efficiently performed, using a force (wind pressure) that blows the flame.

According to some embodiments, the finish processing is performed so as to burn the outer shell protruding portions and keep the unevenness other than the outer shell protruding portions. By so doing, a molded product with excellent design properties (for example, presenting a desirable fabric-like appearance) can be manufactured.

According to some embodiments, the finish processing is performed by moving at least one of the molded body and the surface heating device relative to the other. By so doing, the finish processing can be efficiently performed.

According to some embodiments, the finish processing is performed so as to eliminate the outer shell protruding portions from the surface of the molded body by bringing a solvent which dissolves or softens the outer shells into contact with the outer shell protruding portions, and dissolving or deforming the outer shell protruding portions using a contact device which brings the solvent into contact with the outer shell protruding portions. By so doing, the finish processing can be effectively performed.

According to some embodiments, the contact device is constituted by at least one of spraying the solvent onto the surface of the molded body, soaking the molded body in the solvent, or coating the solvent onto the surface of the molded body. By so doing, the finish processing can be effectively performed.

According to some embodiments, the solvent contacts the outer shell protruding portions as a coating composition including the solvent and a film forming composition. By so doing, a film is formed on a surface by the coating composition, so another effect is obtained, in which a molded product which further suppresses the outer shells from coming off can be manufactured.

According to some embodiments, the coating composition is a liquid composition, which dissolves or disperses in the solvent the film forming component including a colorant of which the color is transparent, or the same type of color as the molded body surface. By so doing, a higher-level single color can be realized on the surface of the molded product to be manufactured.

According to some embodiments, the finish processing is performed so as to dissolve or deform the outer shell protruding portions first from the surface of the molded body and keep the unevenness other than the outer shell protruding portion. By so doing, a molded product with excellent design properties (for example, presenting a desirable fabric-like appearance) can be manufactured.

According to some embodiments, the finish processing is performed by moving at least one of the molded body and the contact device relative to the other. By so doing, the finish processing can be efficiently performed.

According to some embodiments, on the finish-processed surface, coating processing is performed, in which after the outer shell protruding portions are eliminated from the surface of the molded body by the finish processing, a coating film is formed which improves at least one of weather resistance, abrasion resistance, scratch resistance, or smoothness of the surface. By so doing, a molded product which further suppresses an outer shell from coming off can be manufactured.

Additionally, the following molded product is provided by an aspect of this invention.

That is, some aspects of the invention provide a molded product, which includes a matrix formed of a polymer material and a plurality of capsules dispersed in the matrix, and in which an unevenness is formed on a surface due to expansion of the capsules. The surface is in a state in which the outer shell protruding portions, in which the outer shells of the capsules protrude outward from the surface of the molded body, are eliminated. Thus, even if such a molded product is used for both a portion in which frequency of contacting an object is high and a portion in which frequency of contacting an object is low, a phenomenon that generates a color difference between these portions can be suppressed, or the effect of the phenomenon can be alleviated. Therefore, another effect is obtained, in which a molded product is provided in which a desirable appearance quality can be maintained.

BRIEF DESCRIPTION OF THE DRAWINGS

These and other objects, advantages and features will be described below with reference to the drawings, in which like numerals represent like parts, and in which.

DETAILED DESCRIPTION OF EMBODIMENTS

Figure 1:
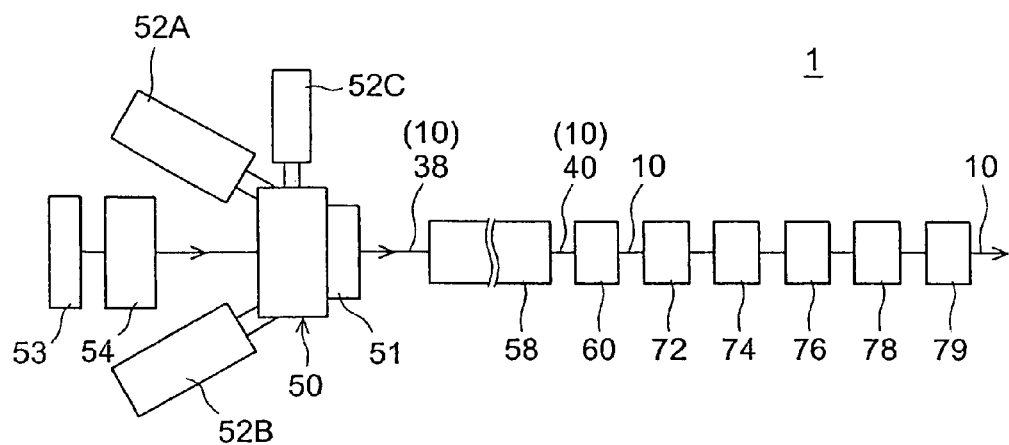
FIG. 1 is a schematic explanatory view showing an extrusion molding apparatus (production line) used for manufacturing a molded product related to an embodiment.

The following explains various embodiments of this invention. Any items (for example, general items related to extrusion molding and other molding methods, such as a method of preparing a molding material, a method of operating an extruder, etc.) needed to implement this invention, other than the items which are particularly referred in this specification, can be interpreted as a design matter by one of ordinary skill in the art, based on prior art technologies. This invention can be implemented based on the items disclosed in this specification and drawings, and technical common sense in the field.

The molded product provided by the technology disclosed here typically has a surface (design surface) which is a molded portion formed by using a molding material (hereafter referred to as an "ornamental portion molding material") including a polymer material constituting the matrix and expandable capsules, and on which unevenness is formed due to expansion of the capsules, and is provided with at least one molded portion (hereafter referred to as an "ornamental portion") in a state in which an outer shell protruding portion is eliminated from the surface. A molded product is also acceptable that is substantially constituted by only the ornamental portion thus described, or which has other components (for example, a molded portion formed by using a molding material whose composition is different from that of the ornamental portion molding material).

Furthermore, at least part of the expandable capsules is already expanded in the molded product, or burst after expansion, or part of the outer shells of the capsules is deformed or contracted after expansion. In this specification, unless specified, "capsules" refers to a concept including unexpanded capsules, expanded capsules, capsules that have burst after expansion, capsules in which part of an outer shell is deformed or contracted after expansion, etc.

For the "expandable capsules," capsules (hereafter referred to as "expandable capsules") with properties of expansion by heat can be suitably used. These thermo-expandable capsules are typically constituted as particles in which an inner substance (normally a gas, a solid body, or a liquid to be vaporized (changed to a gas) by heat) of which volume is increased by heat is filled within an outer shell made of a thermoplastic. A material constituting the outer shell of such thermo-expandable capsules is, for example, acrylic system (co)polymer such as polyvinylidene chloride, vinylidene chloride-acrylonitrile copolymer, polyacrylonitrile, acrylonitrile system copolymer, polymethyl methacrylate, etc.; and a thermoplastic such as polyvinyl chloride, etc. A substance (expanding agent) filled within the capsule is not particularly limited, but low boiling point hydrocarbon such as n-pentane, n-hexane, n-butane, isobutane, isopentane, etc. can be used. Furthermore, not only air and carbon dioxide, but also an inert gas such as nitrogen, argon (part of the inert gas or the entire inert gas can be liquefied), etc. can be used as the inner substance. When such thermo-expandable capsules (hereafter referred to as "capsules") are heated, a thermoplastic constituting an outer shell of the capsules becomes soft, and a volume of the inner substance contained within the outer shell is expanded (that is, the inner substance functions as an expanding agent). Therefore, the capsules are expanded by an inner pressure. Furthermore, the capsules may burst as part of, or the entire, outer shell is expanded beyond the limit of expansion. A small unevenness is formed on the surface of the ornamental portion because of expansion of the capsules, and/or bursting of the capsules after expansion.

The shape of the capsules to be expanded is not particularly limited, but various forms are acceptable such as a spindle shape, a spherical shape, an irregular shape, a cylindrical shape, etc. A spherical shape is preferable in terms of dispersion of the capsules and the ornamental effect of the expanded capsules. Capsules in which an external diameter (maximum external diameter dimension) before expansion are on the order of μm (that is, microcapsules) are preferable. An external diameter of approximately 5 μm to 100 μm is preferable. Approximately 10 μm to 50 μm is more preferable. The external diameter of the capsules dispersed in the polymer material can be substantially identical to each other, and two or more types of capsules with different external diameters can also be provided. In terms of obtaining an appearance similar to an actual cloth, mixing and using two or more types of thermo-expandable capsules having different external diameters (typically various external diameters are provided, that is, unevenness exists in the values of the external diameters) is preferable. In this case, it is preferable that the average value (average external diameter) of the external diameters of the capsules to be used should be within a range described above. Two or more types of capsules with different average external diameters can also be used at an arbitrary ratio.

The surface portion of the molded body disclosed here typically includes capsules expanded to various degrees and can also include capsules which are not substantially expanded. Therefore, the external diameter of the thermo-expandable capsules included in the surface portion can be various external diameters within a range of, for example, an external diameter of a used thermo-expandable capsule (that is, a thermo-expandable capsule prior to expansion) to approximately 500 μm (typically approximately 300 μm or less, for example, 200 μm or less). It is preferable to use a thermo-expandable capsule that can be expanded to an external diameter of approximately double (more preferably approximately four times or more) with respect to the external diameter before expansion. Thus, a capsule with good expandability is suitable for forming a design surface having various sizes of unevenness. Because of such a design surface, an excellent design effect can be realized.

As for thermo-expandable capsules on the market (including a product on the market in which thermo-expandable capsules are sold as a masterbatch) which can be suitably used, a product named "Expancel Microsphere" sold by Nippon Fillite Kabushiki Kaisha or Akzo Nobel, etc., a product named "Matsumoto Microsphere" sold by Matsumoto Yushi-Seiyaku Co., Ltd., a product named "Dieform" sold by Dainichiseika Color & Chemicals Mfg. Co., Ltd., a product named "Advancell" sold by Sekisui Chemical Co., Ltd., etc. can be listed.

A polymer material constituting a matrix which disperses such capsules can include one type, or two or more types, of polymer components selected from among various rubbers, resins (typically thermoplastic), and other polymers. As rubber, natural rubber (NR); various synthetic rubbers such as acrylic rubber (ACM), ethylene-acrylic rubber, butyl rubber (IIR), ethylene-propylene rubber (EPM), ethylene-propylene-diene rubber (EPDM), fluoro rubber, chloroprene rubber (CR), nitrile rubber (NBR), butadiene rubber (BR), polyisoprene rubber (IR), styrene-butadiene rubber (SBR), chlorosulfonic polyethylene (CSM), chlorinated polyethylene rubber (CPE), silicone rubber, etc can be used. As an example of a thermoplastic, a polyolefine system resin such as polyethylene, polypropylene, etc.; a styrene system resin such as polystyrene, acrylonitrile-butadien-styrene resin (ABS), etc.; polyvinyl chloride, etc. are listed. The above-mentioned polymer component can be a thermo-plastic elastomer (TPE). For example, various TPEs such as a styrene system, an olefine system, an ester system, a polyamide system, a polyvinyl system, a urethane system, etc., can also be used. The technology disclosed here can be suitably applied to a molded product in which the matrix is formed of a polymer material of a rubber system (that is, a polymer material in which a polymer component is mainly rubber).

For an ornamental portion molding material, various subcomponents can be contained, as needed. As examples of such a subcomponent, a powder and/or fiber-like solid filler are listed. As examples of such a solid filler, ceramic powders (including various inorganic compound powder such as talc, etc. Hereafter the same.), carbon powders (for example, carbon black), wood powders, ceramic fibers, and carbon fibers are listed. The amount to be used (contained amount) when a filler is used depends on the type of filler and the usage of the ornamental body. Typically, it is preferable to mix the filler at a ratio of approximately 1 to 60% by weight with respect to the overall molding material. Alternatively, a molding material of a composition is also acceptable that does not substantially include a filler. As for the molding material, in addition to the solid filler as an arbitrary component, various supplemental components (additives) can be included, as needed. As a supplemental component, antioxidants, light-stability agents, UV absorbents, plasticizers, lubricants, colorants (pigments, dyes), flame retarders, dispersants, antibacterial agents, charge suppressing agents, etc. are listed.

The molded products disclosed here can be obtained by performing a finish processing, which eliminates at least the outer shell protruding portions from the surface with respect to the original molded product provided with a molded portion (molded portion corresponding to an ornamental portion of the molded product. Hereafter referred to as an "original ornamental portion") formed of such an ornamental portion molding material and having exposed outer shell portions of the capsules and outer shell protruding portions on the surface. The following specifically explains a preferred embodiment of a molded product related to this invention and a method of manufacturing the molded product, with reference to drawings.

Figure 6:
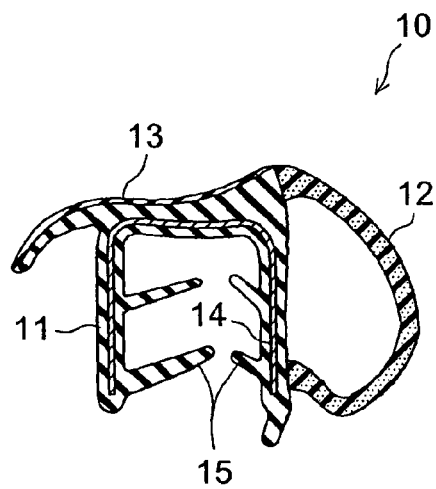
FIG. 6 is a cross-sectional view showing a final shape of a molded product related to an embodiment.

FIG. 1 is a schematic explanatory view showing a main portion of a molded product manufacturing apparatus (production line) 1 used in this embodiment. Here, as an example, a case is explained in which a molded product (weather strip for vehicle) 10 having a cross-sectional shape shown in FIG. 6 is manufactured, using the manufacturing apparatus 1. Furthermore, in the following explanation, for the convenience of explanation, the same symbol 10 is used for both the complete product and for the weather strip during the manufacturing (molding).

As shown in FIG. 6, the weather strip 10 as a complete product is a door opening trim, which is mounted along a flange of an undepicted peripheral portion of a door opening of a car body and seals a space between the door and the door opening. This weather strip 10 is an elongate body, in which an attaching portion 11, of which a horizontal cross section has a U shape, and a hollow-shaped seal portion 12 are integrally formed. An ornamental portion 13 is formed in a layered shape on the surface of the attaching portion 11. Preferably, these molded portions (that is, the attaching portion 11, the seal portion 12, and the ornamental portion 13) are integrally formed by extrusion molding. In the attaching portion 11, a core member 14 is embedded for reinforcement. The core member 14 may, for example, be punched or otherwise formed from a thin metal plate. Furthermore, on opposing inner surfaces of the attaching portion 11, a plurality of (four in this case) gripping fins 15 are arranged, each for gripping a flange of the attachment body (undepicted) to which the weather strip is to be fixed. As a preferred example, the attaching portion 11 is formed by already-vulcanized EPDM, in which carbon black has been mixed at 20-40% by weight. The seal portion 12 is formed by a rubber material which is softer than the already-vulcanized EPDM of the attaching portion 11 and which is excellent in elastic deformation (for example, a sponge-like EPDM that is formed by foaming a material into which carbon black is mixed at 20-40% by weight).

Figure 3:
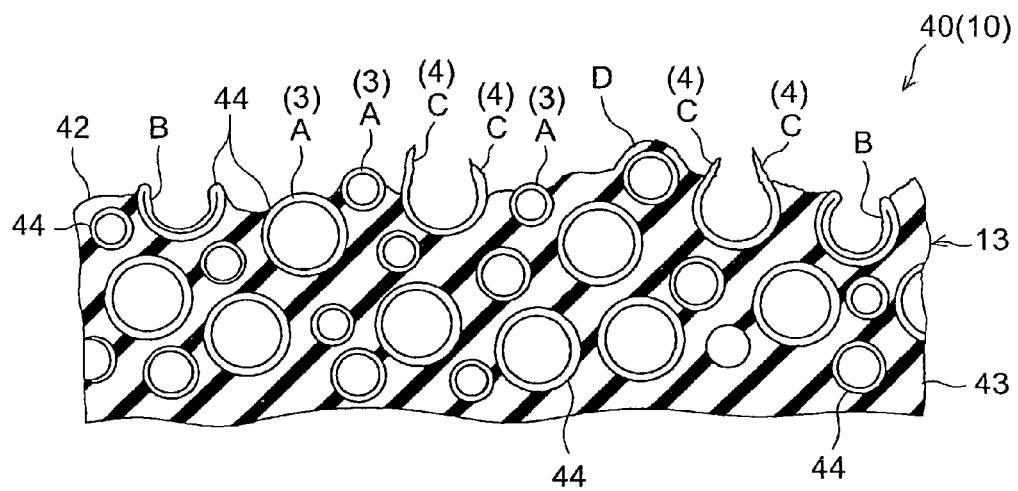
FIG. 3 is an enlarged cross-sectional view schematically showing a structure near a surface related to an embodiment of an molded body, and is a cross section along line III-III of FIG. 2.
Figure 5A:
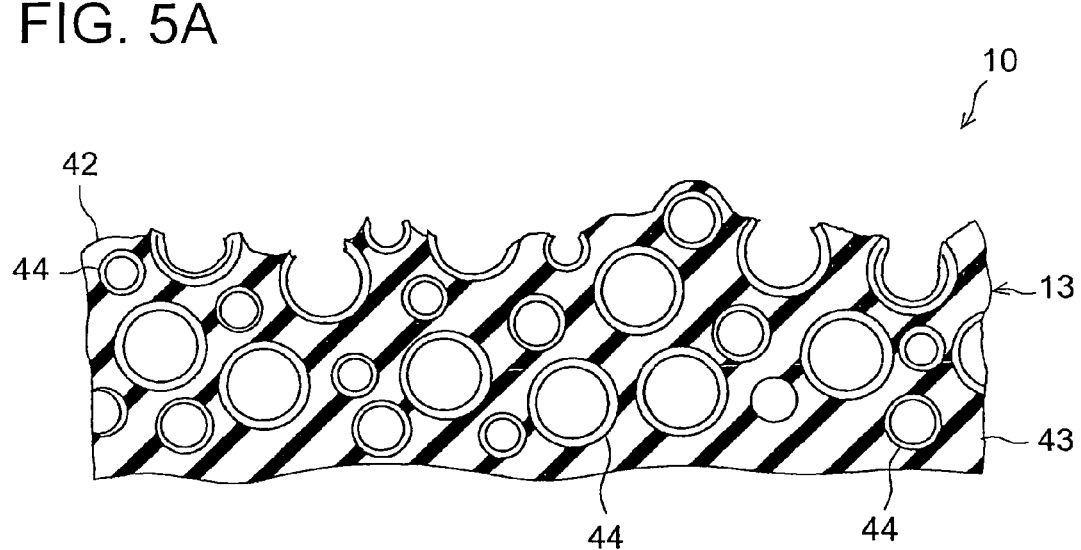
FIG. 5A is a cross section along V-V of FIG. 2, and is an enlarged cross-sectional view schematically showing a structure near a surface related to an embodiment of a molded product to which finish processing has been performed which burns outer shell protruding portions.

The ornamental portion 13 is formed by vulcanizing the ornamental portion molding material by heat after extruding it, and performing later-described finish processing. The ornamental portion molding material is formed by mixing a vulcanizing agent and thermo-expandable capsules with unvulcanized rubber as a polymer component. As a preferred example, a polymer component constituting the ornamental portion molding material is an unvulcanized EPDM, and the ornamental portion 13 is provided with a structure in which thermo-expandable capsules are dispersed within already-vulcanized EPDM (matrix). Here, on the surface of the ornamental portion 13 of the weather strip 10 (that is, the molded body) to be finish-processed, as shown in FIG. 3, a plurality of uneven portions caused by expansion of the capsules are formed. Additionally, there are exposed outer shell portions, which are portions at which the outer shells of expanded capsules are exposed to the surface, and outer shell protruding portions, at which the outer shells of capsules that have burst after expansion protrude outward from the surface. Meanwhile, on the finish-processed surface of the ornamental portion 13 (that is, the ornamental portion 13 of the completed weather strip 10), for example, as shown in FIG. 5A, the uneven shape caused by expansion of the capsules is kept, and the outer shell protruding portions are eliminated by the finish processing.

As the capsules mixed with the ornamental portion molding material, according to the composition of the molding material, it is preferable to use thermo-expandable capsules provided with an outer shell formed by a material having a softening temperature higher than the mixing temperature of the molding material. The ornamental portion 13 of the weather strip 10 related to this embodiment is molded by extruding a clayey rubber material (here EPDM), which is not yet vulcanized, normally at a temperature of 50 to 90° C. Therefore, it is preferable that the outer shell constituting material of the capsule should be a material with a softening temperature higher than the mixing temperature of the ornamental portion molding material. Furthermore, in this embodiment, by using heat when the unvulcanized rubber is vulcanized by heating the weather strip 10 during manufacturing, the capsules are expanded or burst, and at least the softening and expanding of the capsule outer shells is completed before vulcanizing is completed. Because of this, as thermo-expandable capsules to be used for this embodiment, a material is selected in which the softening temperature of the outer shell constituting material is higher than an extrusion molding temperature (molding temperature when the molding material is extruded from a later-described extruding mold 50) of the ornamental portion molding material, but lower than the vulcanizing temperature of the molding material. That is, it is preferable to use capsules that can be burst at a temperature lower than the vulcanizing temperature. Specifically, thermo-expandable capsules can be preferably used in which the outer shells begin to be softened and expanded at approximately 120° C., and the bursting temperature is 150-200° C. This is not particularly limited, but the compounding ratio of the capsules with respect to the ornamental portion molding material can be, for example, approximately 0.1-10% by weight.

The following explains a structure and an operation of a manufacturing device 1 which is suitably used for manufacturing the weather strip 10 having such a structure. As shown in FIG. 1, a front end (downstream side) of an extrusion die 50 is provided with an end plate 51. In the end plate 51, an orifice (extruding port) is formed in a shape corresponding to a horizontal cross-sectional shape (see FIG. 4) of the weather strip 10, as it exists during manufacturing. To the extrusion die 50, extruders 52A, 52B, 52C are connected, which can supply different molding materials from different portions of the extrusion die 50 to respective molding material passages, which are separated from each other within the extrusion die 50.

When the weather strip 10 is manufactured, from these extruders 52A, 52B and 52C, an attaching portion molding material used for molding the attaching portion 11 (in this embodiment, EPDM material mixing 20 to 40% by weight of carbon black and a vulcanizing agent), a seal portion molding material used for molding the seal portion 12 (same as above, EPDM material mixing 20-40% by weight of carbon black, a vulcanizing agent, and a foaming agent), an ornamental portion molding material used for molding the ornamental portion 13 (same as above, EPDM material mixing the thermo-expandable capsules, 5 to 15% by weight of colorant (in this case, carbon black), and a vulcanizing agent in addition to other additives, as needed. The softening temperature of the thermo-expandable capsules is approximately 120° C., and the explosion temperature is approximately 170° C.) are supplied to the respective corresponding molding material passages. These molding materials join at the upstream side of the end plate 51 and are integrally extruded from the orifice as an unvulcanized molded body 38 having a horizontal cross-sectional shape corresponding to the weather strip 10 shown in FIG. 4 (co-extrusion molding). Furthermore, after the core member 14 to be embedded in the attaching portion 11 is pulled from an uncoiler 53 for supplying the core material, it is roll-molded into a substantially inverted V-shape in horizontal cross-section(see FIG. 4) corresponding to the shape of the weather strip 10, as it exists during manufacturing, by a core material roll forming machine 54. The core member 14 is supplied to the extrusion die 50, and extruded along with the attaching portion molding material from the orifice so as to be integrally embedded at a predetermined position within the attaching portion 11.

Here, as the thermo-expandable capsules mixed in the ornamental portion molding material, as described above, the material of the capsule is preferably used that has a softening temperature and a bursting temperature higher than the extrusion molding temperature of the molding material (which is generally 50 to 90° C.). Therefore, as the ornamental portion molding material is extruded from the extrusion die 50, the capsules do not burst adjacent to the extrusion die 50. The ornamental portion 13, which has been extruded from the orifice of the extrusion die 50 integrally with the attaching portion 11 and the seal portion 12, is sent to a heating type vulcanizing tank 58 shown in FIG. 1 in a state in which the capsules to be expanded are typically dispersed in unvulcanized rubber (there is a possibility that the overall ornamental portion might be slightly expanded due to the expansion of the gas contained in the capsules).

The unvulcanized molded body 38 sent to the heating type vulcanizing tank 58 is heated by a heating device that uses high frequency waves, microwaves, or hot air, etc., within the vulcanizing tank 58 (generally heated to a temperature of 180-230° C.). Such heat can be suitably implemented in a state in which the surface side of the ornamental portion 13 of the unvulcanized molded body 38 is heated first. Alternatively, it can also be implemented in a state in which the overall unvulcanized molded body 38 is substantially evenly heated. Because of the heat, the unvulcanized rubber constituting each molded portion (attaching portion 11, seal portion 12, ornamental portion 13) is respectively heated and vulcanized, and adjacent molded portions are firmly joined into one by vulcanizing joining. Furthermore, in this embodiment, the heating temperature in the vulcanizing tank 58 is set at the same temperature or higher than the bursting temperature of the capsules. Thus, as the EPDM constituting the ornamental portion 13 is vulcanized by the heat at the time of vulcanizing, at least part of the capsules included in the ornamental portion 13 are expanded, and at least some of the expanded capsules exceed the limitation of expansion and burst.

Due to expansion and bursting of the capsules, a plurality of small uneven portions are formed on the surface of the ornamental portion 13. FIG. 3 schematically shows a surface shape of the ornamental portion 13 after the expansion and bursting of the capsules. Here, 42 of the figure shows the surface of the ornamental portion 13, 43 shows a matrix constituted by a polymer material (in this case, vulcanized EPDM), and 44 shows capsules dispersed within the matrix (continuous phase). According to the depicted example, at the surface of the ornamental portion 13, after part of the outer shells of expanded capsules 44 have been exposed at the surface 42, there are portions that have been cooled while keeping the expanded shape (A of the figure); and outer shell portions which have been cooled in a state in which part of the outer shells of expanded capsules 44 are contracted or reduced (drooped) as a gas leaks after part of the outer shells of the expanded capsules 44 is exposed to the surface 42 (concave portions shown by B in the figure. There is a case that these may be completely or partially reduced); portions which have been cooled as part of the outer shells of capsules 44 that have burst after the expansion protrude outward from the surface 42 (C of the figure. Furthermore, a concave portion is formed inside these exploded capsules 44); and portions (convex portions shown by D in the figure) in which capsules 44 in the vicinity of the surface 42 are expanded and the polymer material surrounding the capsules is outwardly protruded (raised), and which have been formed by being cooled as-is; etc. The portions (3 of the figure) which are exposed to the surface while the outer shells of the capsules 44 are raised, and which are the portions shown by A, are typical examples of an "exposed outer shell portion" of the technology disclosed here. Furthermore, portions (undepicted) in which the outer shell of a capsule 44 is exposed without protruding from the surface are also included in the concept of the "exposed outer shell portion" discussed here. Meanwhile, the portions (4 of the figure) in which the outer shells of the capsules 44 protrude outward from the surface, and which are the portions shown by C, are typical examples of the "outer shell protrusion portion" of the technology disclosed here. That is, according to this embodiment, by at least one of vulcanizing and heating the unvulcanized molded body 38 in the vulcanizing tank 58, and expanding and bursting the capsules 44, the molded body 40 having the exposed outer shell portions 3 and the outer shell protruding portions 4 on the surface 42 of the ornamental portion 13 is formed.

Figure 5B:
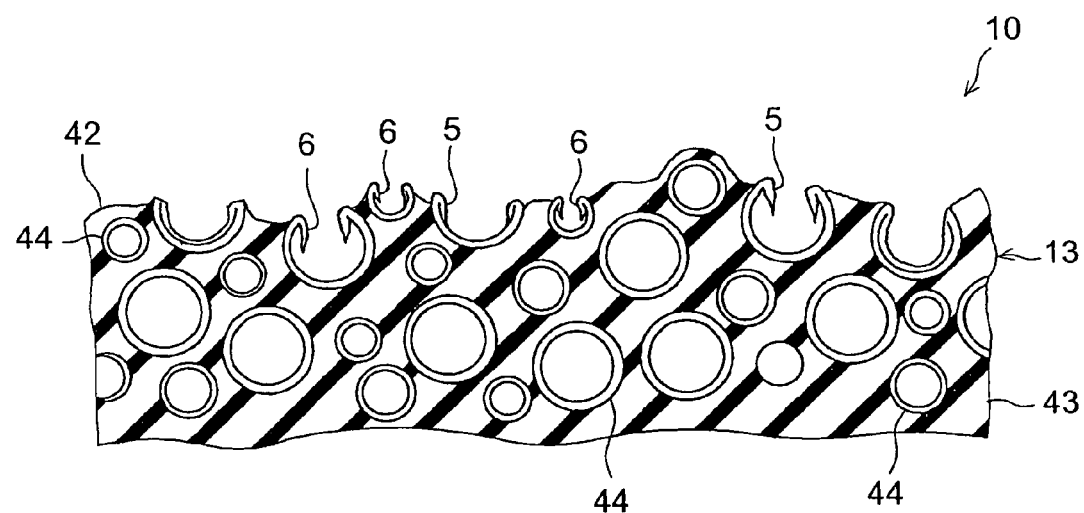
FIG. 5B is a cross section along line V-V of FIG. 2, and is an enlarged cross-sectional view schematically showing a structure near a surface related to an embodiment of a molded product to which finish processing has been performed which thermally deforms and eliminates outer shell protruding portions.
Figure 5C:
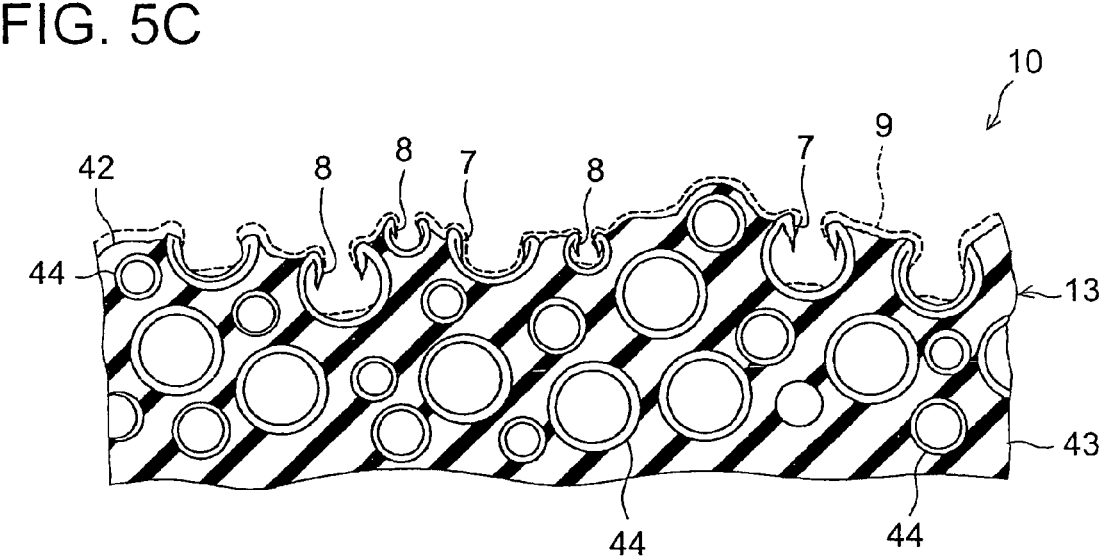
FIG. 5C is a cross section along line V-V of FIG. 2, and is an enlarged cross-sectional view schematically showing a structure near a surface related to an embodiment of a molded product to which finish processing has been performed which dissolves and deforms outer shell protruding portions so as to be eliminated.

Furthermore, FIG. 3 and later-described FIGS. 5A, 5B, 5C schematically show cross sections of the expanded capsules 44 as a substantially round shape. However, in reality, the cross section of the capsules 44 is not limited to a round shape, but there is a possibility that various shapes such as an elliptical shape, etc. may be mixed. Furthermore, in these figures, the size of the capsules 44 is generally shown by three levels, that is, large, medium, and small. However, in reality, the size of the capsules is not limited to these three levels, but various sizes are typically mixed. Additionally, in these figures, in order for the reader to understand easily, the thickness of the outer shells of the capsules 44 is intentionally enlarged, but in reality, the expanded capsules and the thickness of the outer shells of the capsules that have burst after the expansion are typically approximately from several tenths of 1 μm to several 10 μm. That is, the dimension ratio of the diameter of the capsules and the thickness of the outer shells of these figures do not necessarily reflect an actual dimension ratio.

In the outer shell protruding portions 4 of FIG. 3, the outer shells made of a material more fragile than that of the matrix 43 protrude outward from the surface 42 independently (that is, in a state in which there is no support to the rear surface). Because of this, if outer shell protruding portions 4 still exist in a completed weather strip 10, the outer shells constituting the outer shell protruding portions 4 can be easily bent or peeled off due to contact with an object such as a human body, etc. This causes a location-dependent color difference (depending on the difference in frequency of contact with an object) of the weather strip 10. Furthermore, the outer shells constituting the outer shell protruding portions 4 protrude independently as described above, so if the color of the outer shells is different from that of the matrix 43, it can be easily recognized independently. For example, there are some cases that the outer shell protruding portions 4 are visually recognized as a spotted design. According to the technology disclosed here, with respect to the molded body 40 having the outer shell protruding portions 4, finish processing is performed, which eliminates the outer shell protruding portions 4 from the surface 42. According to this embodiment, the molded body 40 which has passed through the vulcanizing tank 58 is introduced to a finish processor 60, at which the finish processing is performed.

Figure 2:
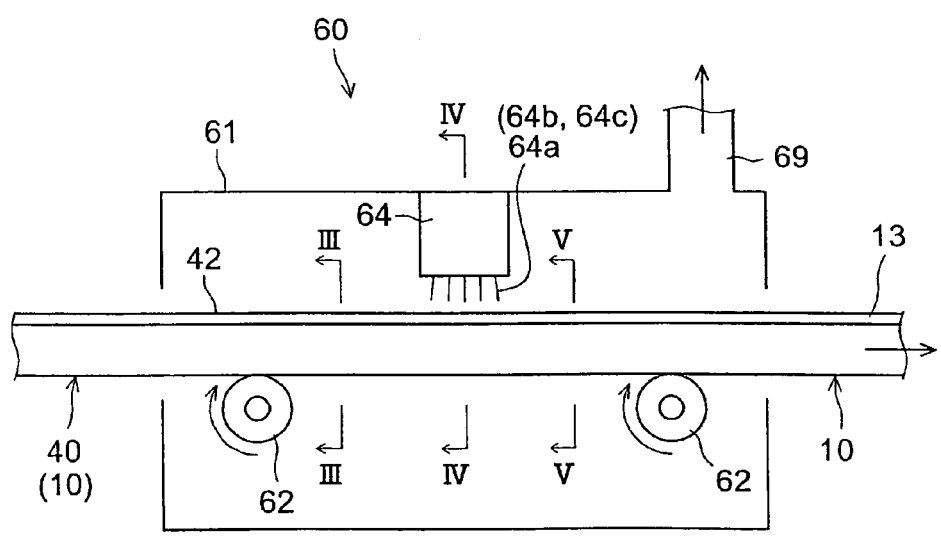
FIG. 2 is a side view showing a finish processor used for manufacturing a molded product related to an embodiment.

As shown in FIG. 2, in the finish processor 60, inside of a chamber 61 (preferably provided with a ventilation outlet 69 and an undepicted intake port), a removal processor 64 is provided, which, from among the exposed outer shell portions 3 and the outer shell protruding portions 4 on the surface (in this case, the surface of the ornamental portion 13) 42 of the molded body 40, removes from the surface 42 at least the outer shell protruding portions 4. Within the chamber 61, a predetermined number of support rollers 62 (two rollers are shown here) is arranged, which are constituted so as to support the molded body 40 when it moves toward the downstream side. The finish processor 60 introduces the molded body 40 from the upstream (vulcanizing tank 58 side) opening of the chamber 61, processes the surface 42 by the removal processor 64, and then sends the molded body 40 out from the downstream opening of the chamber 61.

As the removal processor 64, various types can be used, which eliminate (remove) the outer shell protruding portions 4 on the surface 42 of the molded body 40.

Figure 4:
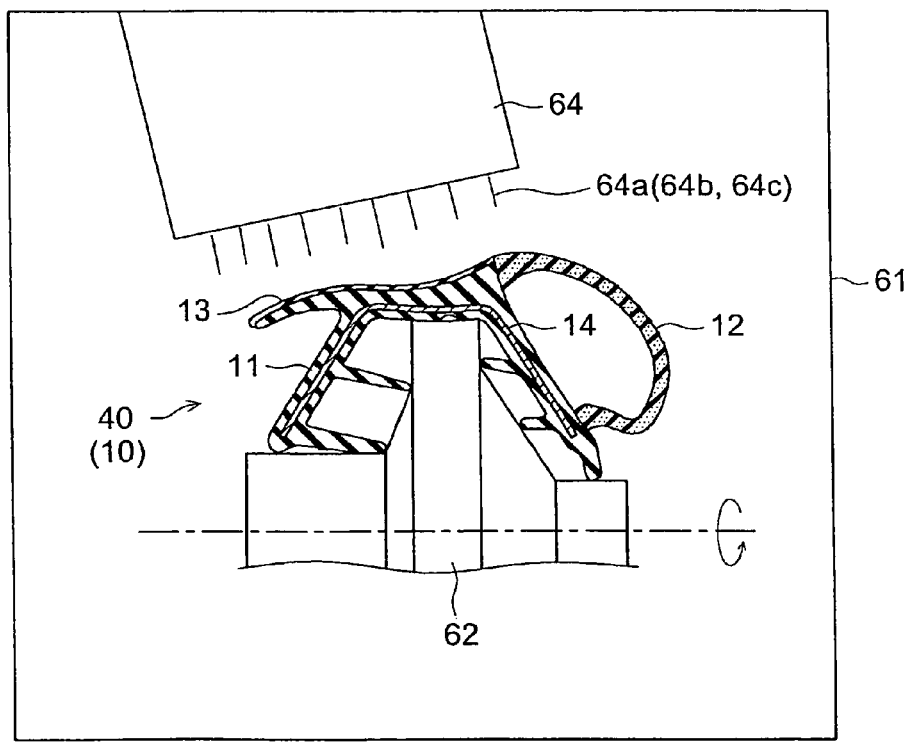
FIG. 4 is a cross section along line IV-IV of FIG. 2.

As an example of the removal processor 64, a burner (burning device) can be used, which is arranged so as to blow a flame toward the surface 42 of the molded body 40. As shown in FIG. 4, by blowing a flame 64a toward the surface 42 of the molded body 40 from the burner 64 and heating the outer shell protruding portions 4 to a temperature (combustion temperature) above an ignition point of the outer shell constituting material, the outer shell protruding portions 4 are burned and eliminated (that is, removed) (combustion processing). As shown in FIG. 3, in the outer shell protruding portions 4, the outer shells independently protrude from the surface 42 (both the front and the back of the outer shells face empty space), so the heat received from the flame cannot be conducted to the surrounding material. Thus, the heat amount required for heating the outer shell protruding portions 4 is less (heat capacity is small). Because of this, the outer shell protruding portions 4 exposed to the flame 64a are burned and eliminated in a short period of time (specifically from several tenths of 1 second to several seconds). Furthermore, burning of the outer shell protruding portions 4 can be more effectively advanced by wind pressure due to blowing of the flame 64a.

Meanwhile, the volume of the matrix 43 is larger than that of the outer shell protruding portions 4, so it is difficult to be heated (heat capacity is large). Therefore, it takes more time to heat to the combustion temperature, compared to the outer shell protruding portions 4. By using the difference in the easiness of heating (time until it is burned), the outer shell protruding portions 4 can be burned (eliminated) without burning the matrix 43. With respect to the burning process, it is preferable that the outer shell protruding portions 4 are eliminated while the unevenness formed on the surface 42 is kept as much as possible, in the portions other than the outer shell protruding portions 4 (while at least the majority of the unevenness is kept, preferably so as not to substantially lose the unevenness). A burning processing condition such as output of the burner 64, the distance between the burner 64 and the surface 42, the time (processing time) during which the surface 42 is exposed to the flame 64a, etc., can be appropriately adjusted so as to perform this type of burning processing.

Furthermore, with respect to the exposed outer shell portions 3 in which the outer shells of the capsules 44 are exposed (typically exposed in a raised shape) at the surface 42, the rear surfaces of the outer shells constituting the exposed portion 3 are at an empty space (internal space of the capsule 44). Therefore, these can be heated in a shorter time than it takes to heat the matrix 43. Thus, without burning the matrix 43, the exposed outer shell portions 3 can be burned along with the outer shell protruding portions 4. It is preferable that the burning processing should eliminate the outer shell protruding portions 4 and the exposed outer shell portions 3 while keeping, as much as possible, the unevenness formed on the surface 42 with respect to the portions other than the outer shell protruding portions 4 and the exposed outer shell portions 3.

FIG. 5A is a cross-sectional view schematically showing a surface structure after finish processing (burning processing), which keeps the unevenness of the surface 42 and burns the outer shell protruding portions 4 and the exposed outer shell portions 3, is performed (after passing under the burning processor 64, that is, being exposed to the flame 64a) with respect to the molded body 40 shown in FIG. 3. In FIG. 5A, the outer shells of the portions constituting the outer shell protruding portions 4 and the exposed outer shell portions 3 of FIG. 3 have been burned and eliminated. That is, in a state shown in FIG. 5A, the outer shell protruding portions 4 and the exposed outer shell portions 3 no longer substantially exist at the surface 42 (they were eliminated from the surface 42). Therefore, in the completed weather strip 10, a phenomenon can be suppressed in which a location-dependent difference of color is generated because the outer shells constituting the outer shell protruding portions 4 and the exposed outer shell portions 3 are peeled off. Furthermore, the portions in which the color of the outer shell can be easily identified independently (exposed outer shell portions 3 and outer shell protruding portions 4) are burned by the burning processing, so without having a spotted design described above, the weather strip 10 can be manufactured, showing a high-level single color (black, in this case).

As another example of the extinction processor 64, a surface heating heater can be used that heats the molded body 40 from the surface 42 side, for example, an infrared ray irradiator. If infrared rays 64b are irradiated toward the surface 42 of the molded body 40 by the infrared ray irradiator 64, the outer shell protruding portions 4, which can be thus heated, are heated to a temperature at or above the softening point or the melting point of the outer shell constituting material in a short period of time. Because of thermal deformation (melting, deformation, contraction, etc.), the outer shell protruding portions 4 heated to such a temperature typically flow down (or are deformed) onto the inside of the burst capsules 44 and the surface 42 around the capsules 44 and disappear from the original location. Meanwhile, in the matrix portion of the molded body 40, the temperature increases more slowly than in the outer shell protruding portions 4 and the exposed outer shell portions 3. Therefore, by intensively heating the outer shell protruding portions 4 without thermally deforming the matrix 43, the outer shell protruding portions 4 can be eliminated from the surface, while keeping the unevenness of the surface 42. Additionally, in the same manner as performing finish processing by burning, along with the outer shell protruding portions 4, infrared ray radiation processing can also be performed so as to eliminate the exposed outer shell portions 3 from the surface 42.

FIG. 5B is a cross-sectional view schematically showing a surface structure after infrared ray radiation processing (one embodiment of surface heating processing) is performed, which eliminates the outer shell protruding portions 4 and the exposed outer shell portions 3 while keeping the unevenness of the surface 42 with respect to the molded body 40 shown in FIG. 3. In FIG. 5B, the outer shells of the portions constituting the outer shell protruding portions 4 of FIG. 3 are also eliminated from the surface 42 by thermal deformation (thermally deformed portions 5 shown in FIG. 5B). Furthermore, the outer shells of the portions constituting the exposed outer shell portions 3 of FIG. 3 are also eliminated from the surface 42 by thermal deformation (thermally deformed portions 6 shown in FIG. 5B). The same processing effect as in the burning processing can also be obtained by the surface heating processing.

As a method of performing the surface heating processing, in addition to the above-mentioned method of irradiating the infrared rays 64b onto the surface 42, for example, a method of putting a flame close to the surface 42, a method of blowing a gas with high temperature against the surface 42, etc., can be used. The same processing effect as in the finish processing by the infrared ray irradiation can be obtained by these surface heating processing methods. The surface heating processing by using a method of putting a flame close to the surface 42 can be implemented by using, for example, a burner as the removal processor 64. In this case, the finish processing by the burner 64 can be performed in, for example, a flame blowing condition in which the outer shell protruding portions 4 (or the outer shell protruding portions 4 and the exposed outer shell portions 3) are thermally deformed and eliminated, but heated to a degree at which they are not completely burned. Alternatively, part of the outer shell protruding portions 4 (or the outer shell protruding portion 4 and the exposed outer shell portions 3) can be eliminated by thermal deformation, and a flame can be blown onto the remainder so as to burn the remainder. Furthermore, surface heating processing by a method of blowing a high-temperature gas against the surface 42 uses, for example, a hot air blower, which can send out high-temperature air, as the removal processor 64, and heats the outer shell protruding portions 4 (or the outer shell protruding portions 4 and the exposed outer shell portions 3) by the high-temperature gas to or above the softening point or the melting point of the outer shells. According to this method, finish processing can be more effectively performed by also using a blowing force (wind pressure) of the high temperature gas.

As another preferred example of the removal processor 64, a solvent supplier can be listed which is constituted so as to supply a solvent, by which the outer shells of the capsules are dissolved or softened, to the molded body 40 and bring the solvent into contact with at least the outer shell protruding portions 4. A solvent supplier is also acceptable that can supply a simple solvent composition including only one, or only two or more, types of solvents (that is, a nonvolatile content is not included). For example, a solvent supplier is also acceptable that can supply a coating agent (coating composition) including one, or two or more, types of solvents and a coating formation component (typically a polymer). As the solvent supplier, various types can be used which can supply such a solvent composition (meaning a composition including the solvent described above, and including both simple solvent compositions and compositions (coating agents, etc.) including a nonvolatile portion). For example, as the removal processor 64 shown in FIG. 4, a spray coater can be suitably used which is constituted so as to be able to spray a solvent composition toward the surface 42 of the molded body 40. The solvent 64c included in the solvent composition which has been supplied (sprayed) to the molded body 40 is heated and evaporated suitably by residual heat (typically the heat remaining from the vulcanizing) of the molded body 40. Furthermore, in order to promote vaporization of the solvent, a removal processor 60 is acceptable that is provided with a drying device (for example, a heater) inside, or downstream from, the chamber 61. The evaporated solvent can be emitted to the outside from the ventilation outlet 69 arranged in the chamber 61.

Thus, in the outer shell protruding portions 4, the outer shells protrude outward from the surface 42 independently (without support). Additionally, the expanded capsules 44 or the outer shells of the capsules 44 that have burst after the expansion typically are thin films with a thickness of approximately from several tenths of 1 μm to several 10 μm. This type of thin-film shaped outer shell is dissolved (or falls off) within a short period of time when contacting the solvent, or is deformed as it loses its shape (a force to hold its own shape) by swelling and disappears from the original location. Therefore, by bringing the outer shell protruding portions 4 into contact with the solvent, the outer shell protruding portions 4 are dissolved or deformed so as to be eliminated from the surface 42. By having the solvent contact not only the outer shell protruding portions 4 but also the exposed outer shell portions 3 (for example, by having the solvent contact the entire surface 42), along with the outer shell protruding portions 4, the exposed outer shell portions 3 can be eliminated from the surface 42.

As a solvent used for the solvent contact processing (finish processing), one solvent, or two or more types of mixed solvents such as a hydrocarbon system solvent such as toluene, xylene, hexane, cyclohexane, etc.; esters such as ethyl acetate, butyl acetate, etc.; ketones such as acetone, methyl ethyl ketone, etc.; a chloride system solvent such as chloroform, dichloroethylene, dichloro acetylene, monochloro benzene, etc. can be listed. According to the type of the outer shell constituting material, it is preferable that a solvent should be selected by which the material can be easily dissolved or expanded (softened). For example, when the outer shell constituting material is methyl polymethacrylate (PMMA) or polyvinylden chloride, a solvent such as a hydrocarbon system, an ester system, a ketone system, a chlorine system, etc. can be preferably used. These solvents can expand polyethylene, so even when the outer shell constituting material is polyethylene, they can be suitably used. A suitable combination of a resin material constituting the outer shells and a solvent for dissolving or expanding the resin material can be easily understood based on a conventional technology, or by performing simple preliminary experiments.

As a solvent used for the solvent contact processing, also taking the type of polymer material (particularly polymer component) constituting the matrix 43 into account, a solvent can be suitably selected by which the outer shell constituting material can be easily dissolved or expanded (softened), and the polymer material constituting the matrix is not easily dissolved. Particularly, as described above, the outer shell protruding portions 4 which have a thin film shape can be dissolved or deformed in a shorter time than the matrix 43. Thus, even when a solvent is used in which a polymer material constituting the matrix 43 can be dissolved or expanded, by adjusting the contact time of the molded body 40 and the solvent (for example, specifically, the supplied solvent is volatized in a short time to a degree that it is sufficient for the outer shell protruding portions 4 to be dissolved or deformed, but is not sufficient for the matrix 43 to be dissolved or deformed), the outer shell protruding portions 4 can be dissolved or deformed while keeping the unevenness on the surface 42. Furthermore, the outer shell protruding portions 4 protrude outward from the surface 42, so by appropriately adjusting the temperature of the surface 42 and the spray amount of the solvent, the sprayed solvent reaches the outer shell protruding portions 4, but does not reach the surface 42 (solvent becomes volatile before that), or even if it reaches the surface 42, the solvent can be supplied in a state in which it becomes dry before it triggers the matrix 43 to be dissolved or swelled. Furthermore, in the same manner as the finish processing by burning, along with the outer shell protruding portions 4, the solvent contact processing can be performed so as to eliminate the exposed outer shell portions 3 from the surface 42.

FIG. 5C is a cross-sectional view schematically showing a surface structure after finish processing (solvent contact processing) is performed, which eliminates the outer shell protruding portions 4 and the exposed outer shell portions 3 while keeping the unevenness on the surface 42 by spraying a solvent over the molded body 40 shown in FIG. 3. In this FIG. 5C, the outer shells of the portions constituting the outer shell protruding portions 4 of FIG. 3 no longer exist on the surface 42, because they have dissolved in contact with the solvent or deformed due to the contact with the solvent (deformed portions 7 shown in FIG. 5C). Furthermore, the outer shells of the portions constituting the exposed outer shell portions 3 of FIG. 3 also no longer exist on the surface 42 due to dissolving or deformation (deformed portions 8 shown in FIG. 5C). The same processing effect as in the above-mentioned burning processing can be obtained by the solvent contact processing as well.

Furthermore, when the solvent to be contacted is supplied in a coating agent (coating composition), as shown in dotted lines of FIG. 5C, because of the solvent included in the coating agent, the outer shell protruding portions 4 and the exposed outer shell portions 3 can be eliminated, and a coating film 9 can be formed. The coating film 9 covers at least part of the surface 42 by a non-volatile portion included in the coating agent. By having such a coating film 9, peeling of the outer shells can be better suppressed. In addition to the film formation component as the nonvolatile portion, a coating agent of the composition including a colorant (pigment, dye, etc.) can also be used. For example, by using a coating agent mixing colorant of the same color (black, in this case) as that of the surface 42 (matrix 43), a single color can be more effectively produced on the surface of the weather strip 10 to be manufactured. Furthermore, by mixing a colorant whose color is different from that of the surface 42, a mixed color of colorant and the surface 42 can be produced; thus, a design effect can be seen. Meanwhile, if a coating agent of a composition which does not include a colorant is used, a transparent coating film 9 is typically formed; thus, the color of the surface 42 can be visually seen through the coating film 9.

The coating agent used for the solvent contact processing can form a coating film 9 that improves a performance capability and/or quality of the surface 42 (that is, to improve the quality of the surface 42) of the ornamental portion 13 after drying. For example, a coating agent can be used that forms a coating film 9 that improves at least one of weather resistance, abrasion resistance, scratch resistance, and smoothness of the ornamental portion 13, or any combination of those characteristics. The coating film 9 can be transparent, and/or can have a translucent or opaque color.

Additionally, the thickness of the coating film 9 formed of a coating agent for the solvent contact processing is typically several μm to several 10 μm, but in order to help the readers understand this easily, the thickness of the coating film 9 is intentionally enlarged and shown in FIG. 5C.

As a method of performing this type of solvent contact processing, in addition to a method of spraying a solvent onto the surface 42 as described above, for example, a method of soaking the molded body 40 in the solvent (this can be a solvent composition which includes or which does not include a nonvolatile portion), a method of coating (for example, paint brushing) the solvent onto the surface of the molded body 40, etc., can be used. According to these solvent contact processing methods as well, the same processing effect in the finish processing can be obtained as by spraying the solvent.

In the finish processor 60, the weather strip 10 to which the finish processing (for example, burning processing, surface heating processing, solvent contact processing, etc.) has been performed is then introduced to the surface coater 72 shown in FIG. 1, and the surface of the ornamental portion 13 is coated (for example, spray-coated) with a coating agent and goes through a dryer 74. Thus, the coating agent is baked on or dried, and the coating film is formed. As the coating agent, it is preferable that a coating film is formed that improves at least one of weather resistance, abrasion resistance, scratch resistance, or smoothness of the ornamental portion 13, or any combination of those characteristics. For example, a coating agent (silicone resin system coating agent) which uses a silicone resin system as a main component, a coating agent (urethane resin system coating agent) which uses a urethane resin as a main component, etc. can be suitably used. It is also acceptable to use a coating agent that forms a colorless and transparent coating film. It is also acceptable to use a coating agent that forms the same system coating film as the surface 42 or a coating film with a different color due to composition of the colorant, etc.

Additionally, in the case of a coating agent (for example, a coating agent including a film formation component of a silicone resin system or a urethane resin system, a solvent such as a hydrocarbon system which dissolves the component, a ketone system, etc.) which includes a solvent in which the coating agent dissolves or deforms the outer shell protruding portions 4, the coating agent can be used for the above-mentioned solvent contact processing (that is, in the finish processor 60, the coating agent is coated and dried), and a molded product manufacturing apparatus 1 of a structure omitting the surface coater 72 and the dryer 74 is also possible.

Then, the weather strip 10 is cooled by a cooler 76. The cooled weather strip 10 is supplied to a core member bending machine 78. By bending the core member 14 having the substantially inverted V-shaped (expanded inverted V-shaped) cross-sectional shape, shown in FIG. 4, into a substantially inverted U shape shown in FIG. 6, it is molded in a cross-sectional shape corresponding to the weather strip 10 as a final product (completed product). Furthermore, 79 of FIG. 1 shows a hauling machine which hauls the weather strip 10 during manufacturing (molding), which makes an elongate weather strip. Furthermore, the hauled molded product 10 is cut to predetermined lengths by an undepicted cutter and becomes a completed product (weather strip for a vehicle) via terminal processing, etc.

This invention is thus explained in detail. The above-mentioned embodiments are merely examples and do not limit the scope of the claims. The technology described in the scope of the claims includes various modifications and changes of the above-mentioned specific examples.

For example, in the above-mentioned embodiments, a molding process which molds a molding material in a predetermined shape (extrusion molding in the above-mentioned embodiments); a capsule expansion/bursting processing which forms the molded body 40 having the exposed outer shell portions 3 and the outer shell protruding portions 4 by expanding and bursting the capsules 44 included in the molded body (unvulcanized molded body) 38 molded in the molding process and forming an unevenness on the surface 42; and a finish processing process which performs a finishing process on the molded body 40 and eliminates the outer shell protruding portions 4 (or the exposed outer shell portions 3 and the outer shell protruding portions 4) from the surface 42 are performed in synchronization (that is, they are performed as a series of processes after the extrusion molding). However, the timing at which these processes are performed is not particularly limited. For example, subsequent to the molding process, once the molded body 40 obtained by the capsule expansion/bursting process is cooled and cut to a predetermined length, the molded product 10 can also be manufactured in a state in which a finish processing process is performed at an arbitrary timing with respect to the molded body 40 in a predetermined length which has been thus pre-manufactured. In this case, the processing time of the surface 42 can be set at an arbitrary time by changing the hauling speed of the hauling machine 79 and adjusting a relative speed of the removal processor 64 and the surface 42. Furthermore, the capsule expansion and bursting process can also be performed subsequent to (synchronized with) the above-mentioned molding process. Once the molded body is cooled, by heating the molded body again, the capsules 44 can be expanded and burst so as to make the molded body 40.

The technology disclosed here is not limited to manufacturing a molded product by the above-mentioned extrusion molding, and can also be applied to manufacturing a molded product according to injection molding or other molding methods. For example, after a molding material including a polymer material and capsules is molded into a predetermined shape by injection molding, the molded body can be removed from an injection mold (or an injection mold of at least the portion facing the surface of the ornamental portion is removed). By heating the molded body, preferably from the surface side of the ornamental portion, so as to expand and burst the capsules, the molded body 40 having the exposed outer shell portion 3 and the outer shell protruding portion 4 can be formed on the surface 42. By performing the same finish processing on the molded body 40, the molded product 10 can be manufactured in which the exposed outer shell portions 3 and the outer shell protruding portions 3 are eliminated.

Furthermore, in the above-mentioned embodiments, by having the molded body 40 pass (travel) under the fixed finish processor 64, finish processing was performed by relatively moving the surface of the molded body 40 with respect to the finish processor 64. However, for example, the finish processor 64 can be moved, and the position of the molded body 40 which is cut to a predetermined length can be fixed. Alternatively, both the molded body 40 and the finish processor 64 can be moved.

Additionally, in the above-mentioned embodiments, as shown in FIG. 1, the finish processor 60 is arranged separately downstream from the vulcanizing tank 58. However, the finish processor 60 can also be arranged so as to be continuous with the downstream end of the vulcanizing tank 58, or a structure is acceptable that incorporates the finish processor 64 inside the vulcanizing tank 58. Furthermore, part of the vulcanizing tank 58 can also be used as a finish processor. That is, by making, for example, the downstream portion (typically near the exit) of the vulcanizing tank have a temperature higher than that of other parts of the vulcanizing tank, finish processing can be performed in the downstream portion. As an example, by using a vulcanizing tank that is provided with a structure in which several tanks are connected, and making the most downstream tank be at a high temperature, the finish processing can be easily performed.

Furthermore, in this embodiment, a door opening trim for a car, which is a type of vehicle weather strip to which this invention is applied, and the manufacturing thereof, was explained. However, application of this invention is not limited to this, but can be applied to various molded products suitably with a design surface (preferably a fabric-like appearance) formed by expanding and bursting the capsules. Such molded products include, for example, various vehicle trims (sun roof trim, trim attached to the surrounding of a ceiling material, etc.) other than a door opening trim, an ornamental member for an vehicle interior (interior parts for a vehicle) such a seat rail cover, etc.

What is claimed is:

1. A method of manufacturing a molded product, the method comprising:
    preparing a molded body comprising a polymer material matrix and a plurality of capsules dispersed within the matrix, the capsules having outer shells comprising a material that is (i) thermoplastic or (ii) thermoplastic and soluble, a surface of the molded body having an unevenness due to expansion and/or bursting of the capsules,
    some of the capsules having expanded without bursting and including an exposed outer shell portion that protrudes outward from the surface, and some of the capsules having burst and including an outer shell protruding portion that protrudes outward from the surface; and performing finish processing to the molded body, the finish processing eliminating only both the outer shell protruding portions and the exposed outer shell portions from the surface of the molded body, such that after the finish processing, the unevenness of the surface is kept but the outer shell protruding portions and exposed outer shell portions do not protrude from the surface, the finish processing comprising one of (A) burning the outer shell protruding portions and/or the exposed outer shell portions, (B) heating the molded body to a temperature at which the outer shell protruding portions and/or the exposed outer shell portions are softened, and thermally deforming the outer shell protruding portions and/or the exposed outer shell portions, or (C) bringing a solvent into contact with the outer shell protruding portions and/or the exposed outer shell portions.

2. The method as set forth in claim 1,
wherein the finish processing eliminates the outer shell protruding portions and the exposed outer shell portions from the surface of the molded body by thermally deforming the outer shell protruding portions, using a surface heating device that heats the molded body from the surface side.

3. The method as set forth in claim 2,
wherein the surface heating device performs at least one of irradiating infrared rays toward the surface of the molded body, putting a flame close to the surface of the molded body, or blowing a high temperature gas toward the surface of the molded body.

4. The method as set forth in claim 2,
wherein the finish processing is performed while moving at least one of the molded body or the surface heating device relative to the other.

5. The method as set forth in claim 1,
wherein the finish processing eliminates the outer shell protruding portions from the surface of the molded body by burning the outer shell protruding portions, using a surface heating device that heats the molded body from the surface side and burns the outer shell protruding portions.

6. The method as set forth in claim 5,
wherein the surface heating device exposes the surface of the molded body to a flame.

7. The method as set forth in claim 6,
wherein the surface heating device blows the flame toward the surface of the molded body.

8. The method as set forth in claim 5,
wherein the finish processing is performed while moving at least one of the molded body or the surface heating device relative to the other.

9. The method as set forth in claim 1,
wherein the finish processing eliminates the outer shell protruding portions from the surface of the molded body by bringing a solvent, which dissolves or softens the outer shells, into contact with the outer shell protruding portions, and dissolving or deforming the outer shell protruding portions using a contact device that brings the solvent into contact with the outer shell protruding portions.

10. The method as set forth in claim 9,
wherein the contact device at least one of (i) sprays the solvent onto the surface of the molded body, (ii) soaks the molded body in the solvent, or (iii) coats the solvent onto the surface of the molded body.

11. The method as set forth in claim 9,
wherein the solvent contacts the outer shell protruding portions as a coating composition including the solvent and a film forming composition.

12. The method as set forth in claim 11,
wherein the coating composition is a liquid composition, which dissolves or disperses in the solvent the film forming component including a colorant of which the color is transparent or the same type of color as the molded body surface.

13. The method as set forth in claim 9,
wherein the finish processing is performed while moving at least one of the molded body or the contact device relative to the other.

14. The method as set forth in claim 1,
wherein on the finish-processed surface, coating processing is performed in which, after the outer shell protruding portions are eliminated from the surface of the molded body by the finish processing, a coating film is formed which improves at least one of weather resistance, abrasion resistance, scratch resistance, or smoothness of the surface.

* * * * *